United States Patent
Massenburg

(10) Patent No.: US 6,299,510 B1
(45) Date of Patent: Oct. 9, 2001

(54) ABRASIVE REMOVAL SYSTEM FOR USE WITH HIGH-PRESSURE FLUID-JET CUTTING DEVICE

(75) Inventor: John C. Massenburg, Seattle, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 09/069,223

(22) Filed: Apr. 28, 1998

(51) Int. Cl.$^7$ ..................................................... B24B 1/00
(52) U.S. Cl. ................................ 451/38; 451/39; 451/40; 451/60; 451/2; 239/433
(58) Field of Search .................................. 451/38, 60, 75, 451/99, 101, 88, 87, 446, 39, 40, 2; 239/433, 430

(56) References Cited

U.S. PATENT DOCUMENTS

| | | | |
|---|---|---|---|
| 3,299,533 | 1/1967 | Morris | 34/205 |
| 3,996,032 | 12/1976 | McWilliams et al. | 65/3 C |
| 4,031,006 | 6/1977 | Ramirez et al. | 210/44 |

(List continued on next page.)

FOREIGN PATENT DOCUMENTS

| | | |
|---|---|---|
| 4334673 C1 | 1/1995 | (DE) . |
| 19645142 A1 | 4/1998 | (DE) . |
| 0 613 722 A1 | 9/1994 | (EP) . |
| WO 96/16770 | 6/1996 | (WO) . |
| WO 98/17439 | 4/1998 | (WO) . |

OTHER PUBLICATIONS

"ABRATEC Recycling/Extraction", Intrec GmbH, Berlin, Germany, 18 pages.
"Abrasive Recycling and Containment System", in *FORACON–ARCS–220*, FORACON Maschinen—und Anlagenbau GmbH & Co. KG, pp. 1–10, Jan. 20, 1998.
Carpco, "*Physical Separation Systems for Mineral Processing*", pp. 1–17.
Carpco Catalog, "*Laboratory Equipment for Physical Separation of Materials*", 44 pages.
Schreiber Equipment—Grit Classifier, , http://135.143.3.189/eqgritclass.htm, 5 pages, printed Feb. 2, 1999 and Jul. 22, 1999.
Schreiber Corporation, Inc., "*Aerated Grit & Grease Removal System*", 41 pages.
Westfalia Separator, Inc., "*Separation Technology*", http://www.westfaliaseparatorus.com/separate.html, 2 pages, printed Feb. 2, 1999.
Westfalia Separator Homepage, http://www.westfalia–separator.com, 2 pages, printed Jan. 2, 1999.

*Primary Examiner*—Lee Young
*Assistant Examiner*—Minh Trinh
(74) *Attorney, Agent, or Firm*—Seed Intellectual Property Law Group PLLC

(57) ABSTRACT

An abrasive particle removal device for use with a fluid jet cutting machine includes a tank aligned with a nozzle of the cutting machine, a settling container, and a fluid transport mechanism to transport fluid from the tank to the settling container. The tank includes at least one compartment configured to receive the fluid and the abrasive particles of the fluid-jet along at least a portion of the cutting path. Additionally, the compartment is configured to control fluid flow within the compartment so that the fluid-jet suspends, and maintains the suspension, of at least a substantial portion of the abrasive particles in the one compartment without additional agitation. The fluid transport mechanism can include a conduit with a first end in fluid communication with the compartment and a second end outside of the compartment in fluid communication with the settling container. In operation, a portion of the fluid with suspended abrasive particles in the compartment is transported through the conduit and into the settling container. The abrasive particles from the transported portion of fluid settle to a lower portion of the settling container while a clarified fluid is removed from the settling container.

18 Claims, 7 Drawing Sheets

U.S. PATENT DOCUMENTS

| | | | |
|---|---|---|---|
| 4,045,882 | 9/1977 | Buffington et al. | 34/171 |
| 4,094,399 | 6/1978 | George | 198/535 |
| 4,186,087 | 1/1980 | Kato | 210/44 |
| 4,328,094 | 5/1982 | Peck | 209/160 |
| 4,417,406 | 11/1983 | Eibich | 34/155 |
| 4,436,433 | 3/1984 | Barnes | 366/152 |
| 4,493,961 * | 1/1985 | Prikhodko et al. | 219/69 R |
| 4,656,791 * | 4/1987 | Herrington et al. | 51/410 |
| 4,698,939 * | 10/1987 | Hashish | 51/410 |
| 4,753,020 | 6/1988 | Brunner | 34/196 |
| 4,872,293 | 10/1989 | Yasukawa et al. | 51/410 |
| 4,872,975 | 10/1989 | Benson | 210/99 |
| 4,999,115 | 3/1991 | Peterson | 210/728 |
| 5,003,729 * | 4/1991 | Sherby | 51/283 R |
| 5,038,498 | 8/1991 | Woolsey | 34/225 |
| 5,107,602 | 4/1992 | Lööf | 34/1 V |
| 5,127,199 | 7/1992 | Blankers et al. | 51/425 |
| 5,279,046 | 1/1994 | Vincent | 34/35 |
| 5,341,580 | 8/1994 | Teal | 34/446 |
| 5,361,910 | 11/1994 | Yang et al. | 209/13 |
| 5,433,862 | 7/1995 | Batson | 210/702 |
| 5,505,653 * | 4/1996 | Nedo et al. | 451/5 |
| 5,534,077 * | 7/1996 | Lichtblau et al. | 134/7 |
| 5,551,574 | 9/1996 | Hicks et al. | 209/164 |
| 5,567,245 * | 10/1996 | Watson | 134/7 |
| 5,575,705 * | 11/1996 | Yam et al. | 451/39 |
| 5,643,058 | 7/1997 | Erichsen et al. | 451/99 |
| 5,695,385 * | 12/1997 | Bachand et al. | 451/38 |
| 5,782,673 * | 7/1998 | Warehime | 451/2 |
| 5,908,349 * | 6/1999 | Warehime | 451/102 |

* cited by examiner

ABRASIVE REMOVAL SYSTEM FOR USE WITH HIGH-PRESSURE FLUID-JET CUTTING DEVICE

TECHNICAL FIELD

The present invention relates to fluid-jet cutting devices and methods, and more particularly to such devices including an abrasive removal system.

BACKGROUND OF THE INVENTION

Fluid-jet devices are often used to cut metal parts, fiber-cement siding, stone and many other materials. A typical fluid-jet cutting machine has a high-pressure pump to provide a high-pressure fluid source, and a nozzle is coupled to the high-pressure fluid source to generate a cutting-jet from the nozzle. The nozzle is also attached to a carrier assembly that moves the nozzle along a desired cutting path, and a catch tank is aligned with the nozzle throughout the cutting path. An abrasive particle source may be coupled to the nozzle to impart abrasive particles to the cutting-jet. The fluid is typically water, and the abrasive particles are typically garnet.

In operation of such a fluid-jet cutting machine, a work-piece is positioned between the nozzle and the catch tank. The carrier assembly moves the nozzle along the cutting path, and the high-pressure fluid source and abrasive particle source generate an abrasive cutting-jet projecting from the nozzle. As the cutting-jet passes through the work-piece, the catch tank receives the wastewater and abrasive particles of the spent cutting-jet. The abrasive particles generally accumulate in the catch tank, and the waste water generally flows out of the catch tank.

One concern with fluid-jet cutting systems is that the abrasive particles must be removed from the catch tank. The devices and methods for removing abrasive particles from catch tanks typically depend upon the size of the catch tanks. In general, small catch tanks are typically less than 2'×4', and large catch tanks are typically greater than 4'×8'.

Conventional techniques for removing abrasive particles from small catch tanks generally allow the wastewater to simply overflow the small catch tanks. Although a portion of the abrasive particles are removed from small catch tanks with the overflowing wastewater, abrasive particles still accumulate in small catch tanks. The remaining abrasive particles are typically removed from small catch tanks by: (1) stopping the cutting-jet to allow the abrasive particles to settle; and (2) shoveling or dumping the abrasive particles from the catch tank.

One problem with conventional techniques from removing abrasive particles from small catch tanks is that the cutting machine must be shut down for a period of time to allow the abrasive particles to settle. Removing abrasive particles from small catch tanks may accordingly result in a significant amount of down-time in a cutting operation. Another problem with removing abrasive particles from small catch tanks is that it is inconvenient and labor intensive to shovel or dump the abrasive particles from the tanks. Therefore, removing abrasive particles from small catch tanks reduces the efficiency and productivity of fluid-jet cutting processes.

Conventional techniques for removing abrasive particles from large catch tanks are different than those for small catch tanks. One conventional abrasive removal system for large catch tanks is a conveyor rake that moves across the bottom of a large catch tank and up a discharge side of the tank. To most effectively operate a conveyor rake, the abrasive particles must settle to the bottom of the tank. The conveyor then carries the abrasive particles from the bottom of the tank and over the discharge side of the tank. One potential problem with conveyor rakes, therefore, is that they may need to be operated when the cutting-jet is shut down causing down-time. Another problem with conveyor rakes is that they may be cut by the cutting-jet during the cutting process if the cutting-jet passes over the portion of the conveyor rake at the discharge side of the catch tank. Additionally, conveyor rake removal systems may be relatively expensive units with many moving components that may fail after extended use. Thus, conveyor rake systems for removing abrasive particles from large catch tanks have several drawbacks.

Another conventional system for removing abrasive particles from large catch tanks is a continuous centrifugal system that has a large pump in the catch tank and a centrifugal separator outside of the catch tank. The large pump agitates the wastewater to suspend the abrasive particles in the catch tank. The wastewater and the suspended abrasive particles are then pumped to a centrifuge, such as a hydrocyclone separator, to separate the abrasive particles from the wastewater. One drawback of this device is that large, expensive pumps are required to maintain the abrasive particles in suspension in the wastewater. Another drawback of this abrasive removal system is that a significant amount of energy is required to operate such large pumps. Additionally, hydrocyclone separators are also relatively costly devices that require additional resources to operate and maintain. Thus, centrifugal removal systems also have several drawbacks.

SUMMARY OF THE INVENTION

The invention is generally directed toward fluid jet-cutting machines and abrasive particle removal devices. In one embodiment, a fluid-jet cutting machine has a nozzle and a carrier assembly that moves the nozzle along a cutting path. A high-pressure fluid source and an abrasive particle source are coupled to the nozzle to generate an abrasive cutting-jet having a fluid and a plurality of abrasive particles. In general, the fluid can be water and the abrasive particles can be composed of garnet.

The cutting machine also has a particle removal device including a tank aligned with the nozzle, a settling container, and a fluid transport mechanism to transport fluid from the tank to the settling container. The tank includes at least one compartment configured to receive the fluid and the abrasive particles of the cutting-jet along at least a portion of the cutting path. Additionally, the compartment is configured to control fluid flow within the tank so that the cutting-jet continuously suspends at least a substantial portion of the abrasive particles in the one compartment without additional mechanical agitation. The compartment itself, for example, can be sized and/or shaped so that the jet energy alone maintains the abrasive particles in suspension. The fluid transport mechanism can include a conduit with a first end in fluid communication with the compartment and a second end outside of the compartment in fluid communication with the settling container.

In operation, a portion of the fluid with suspended abrasive particles in the compartment is transported through the conduit and into the settling container. For example, a fluid drive system may be coupled to the conduit to draw fluid from the compartment and through the conduit. The abrasive particles from the transported portion of fluid settle to a lower portion of the settling container while a clarified fluid is removed from the settling container. The clarified fluid may also be pumped back to the catch tank.

DETAILED DESCRIPTION OF THE INVENTION

The present invention is directed toward devices and methods for removing abrasive particles from fluid-jet cutting machines. Many specific details of certain embodiments of the invention are set forth in the following description and in FIGS. 1–7 to provide a thorough understanding of such embodiments. One skilled in the art, however, will understand that the present invention may have additional embodiments, or that the invention may be practiced without several of the details described in the following description.

Figure 1:
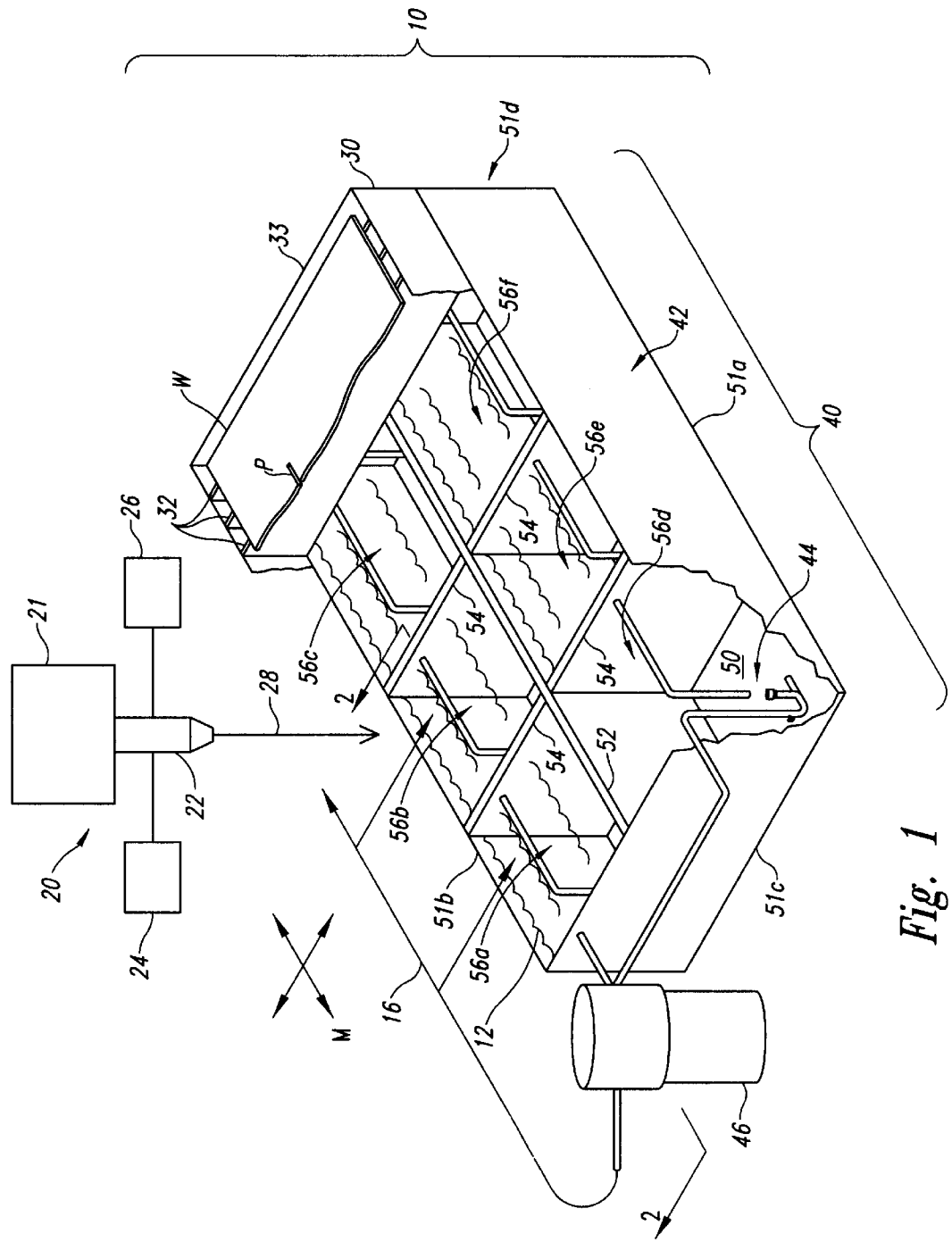
FIG. 1 is a schematic isometric view of a fluid-jet cutting machine with a cut-away view of one embodiment of an abrasive particle removal system.

FIG. 1 is a schematic isometric view of a fluid-jet cutting machine 10. In this embodiment, the cutting machine 10 includes a cutting head 20 with a carrier assembly 21 and a nozzle 22 attached to the carrier assembly 21. A high-pressure fluid source 24 and an abrasive particle source 26 are coupled to the nozzle 22 to generate an abrasive cutting-jet 28 projecting from the nozzle 22. Additionally, the cutting machine 10 also includes a work-piece support structure 30 with a number of support members or beams 32 attached to a frame 33. In operation, the carrier assembly 21 moves the nozzle 22 along desired X-Y coordinates (arrows M) to move the cutting-jet 28 along a desired cutting path P with respect to a work-piece W. One suitable cutting head 20 is the Bengal 4×4 and Paser 3 System manufactured by Flow International Corporation of Kent, Wash.

The cutting machine 10 also includes an abrasive particle removal system 40. In one embodiment, the abrasive particle removing system 40 has a catch tank 42 under the support structure 30, a fluid transport mechanism 44 in the catch tank 42, and a settling container 46 coupled to the fluid transport mechanism 44. As described in greater detail below, the abrasive particle removal system 40 continuously removes abrasive particles from the catch tank 42 without using mechanical agitators to suspend the abrasive particles in the waste fluid.

The catch tank 42 preferably has a bottom panel 50, first and second side-walls 51a and 51b projecting upward from opposing sides of the bottom panel 50, and first and second end-walls 51c and 51d projecting upward from opposing ends of the bottom panel 50. The first and second side-walls 51a and 51b are attached to the first and second end-walls 51c and 51d to form a large cavity. The catch tank 42 also includes a central divider 52 extending longitudinally within the tank 42, and a plurality of crossing dividers 54 extending transverse to the central divider 52. The dividers 52 and 54 define a plurality of compartments 56 (identified by reference numbers 56a–56f) in the tank 42.

The compartments 56 receive the waste-fluid 12 and the abrasive particles of the cutting-jet 28. Additionally, each compartment 56 is configured to control the fluid flow within the tank 42. For example, when the cutting-jet 28 is aligned with compartment 56b, the dividers 52 and 54 defining this compartment control the fluid flow such that the cutting-jet 28 alone suspends a significant portion of the abrasive particles in the waste-fluid 12. As such, by dividing the tank 42 into smaller compartments 56, the cutting-jet 28 maintains at least a substantial portion of the abrasive particles in suspension in the waste-fluid 12 within a particular compartment aligned with the cutting-jet 28 without additional mechanical agitation. In general, each compartment is approximately between 1'×1' and 4'×8', and more preferably about 2'×4'. As explained in more detail below, the fluid transport mechanism 44 continuously removes waste-fluid 12 and abrasive particles from the compartments 56.

Figure 2:
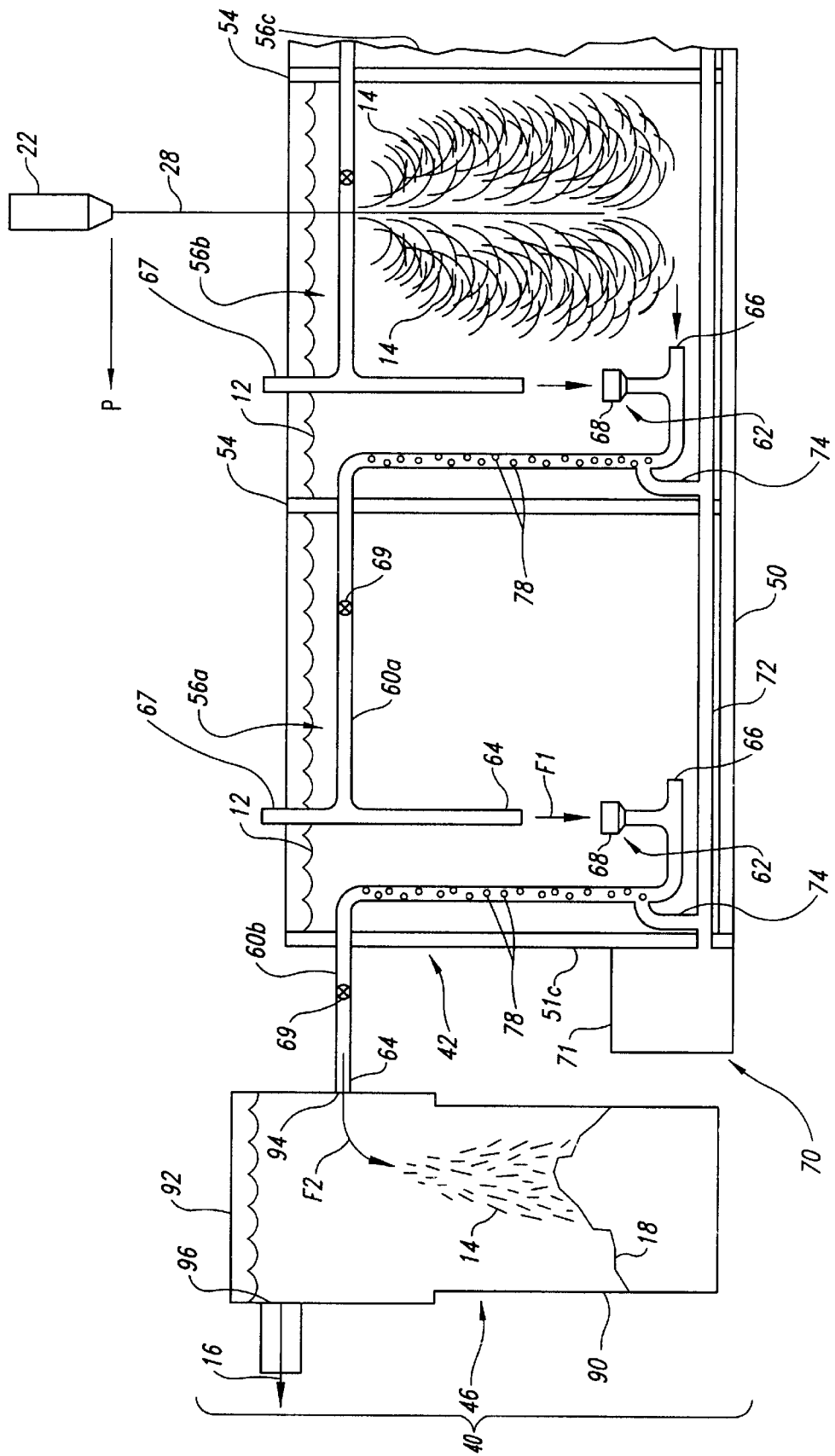
FIG. 2 is a partial cross-sectional view of the abrasive removal system of the fluid-jet cutting machine shown in FIG. 1.

FIG. 2 is a partial cross-sectional view of a portion of the removal system 40 in which the fluid transport system includes a number of conduit sections 60 (identified by reference numbers 60a and 60b). The conduit sections 60 are configured in a serial arrangement to transport waste fluid and abrasive particles to the settling container 46 from the compartments 56a, 56b and 56c. The conduit sections 60 include at least a first conduit section 60a having a first end 62 positioned in the lower portion of compartment 56b and a second end 64 positioned in compartment 56a. The first conduit section 60a also has a first intake opening 66 proximate to the bottom panel 50, a second intake opening 68 located to receive a fluid flow from a conduit section from the adjacent upstream compartment 56c, and a vent 67 toward the second end 64. The second intake opening 68, for example, can be a funnel. The conduit sections 60 can also include a second conduit section 60b similar to the first conduit section 60a, and thus like reference numbers refer to like components. The second conduit section 60a has a first end 62 positioned in the lower portion of compartment 56a and a second end 64 coupled to the settling container 46. The second intake opening 68 of the second conduit section 60b is located to receive a first fluid flow $F_1$ from the second end 64 of the first conduit section 60a. Accordingly, the first and second conduit sections 60a and 60b define a conduit that transports waste fluid and abrasive particles from the compartments 56a and 56b to the settling container 46.

To generate fluid flows through the conduit sections 60, a fluid drive system 70 is preferably coupled to the conduit sections 60 to drive the waste-fluid 12 and the abrasive particles 14 through the conduit sections 60. In this particular embodiment, the fluid drive system 70 includes a fluid driver 71, a primary line 72 coupled to the fluid driver 71, and a plurality of branch feed lines 74 coupled to the primary line 72. The fluid driver 71 can be a pressurized gas source, such as an air compressor. The primary line 72 generally passes through the dividers 52 and 54 to supply pressurized gas to all of the compartments 56. The branch feed lines 74 are attached to the conduit sections 60 below the fluid level of the waste-fluid 12 in the compartments 56. In operation, the pressurized gas source 71 injects a gas 78, such as air, into the conduit sections 60. The gas 78 accordingly rises through the vertical portions of the conduit sections 60 drawing waste-fluid 12 and any abrasive particles 14 suspended in the waste-fluid 12 through the conduit sections 60. The gas 78 passes through the vents 67, while the fluid continues to flow through the conduit sections 60. The fluid drive mechanism 70, therefore, generates the first fluid flow $F_1$ through the first conduit section 60a and a second fluid flow $F_2$ through the second conduit section 60b.

The settling container 46 receives the second fluid flow $F_2$ from the second conduit section 60b. The settling container 46 can have a disposable drum 90 and a shroud 92 attached to a rim of the drum 90. The shroud 92 has an inlet 94 coupled to the second end 64 of the second conduit section 60b, and the shroud 92 has an outlet 96 through which a clarified fluid 16 flows from the settling container 46. As the second fluid flow $F_2$ enters the shroud inlet 94, the abrasive particles 14 fall downward and form an abrasive particle accumulation 18 in the drum 90. The clarified fluid 16 accordingly rises to the shroud outlet 96. The clarified fluid 16 can then be pumped beck to the compartments 56 in the catch tank 42 (shown schematically in FIG. 1), or it can overflow the container 46 in flow into a drain.

Referring to FIGS. 1 and 2 together, the abrasive removal system 40 removes abrasive particles from at least one of the compartments 56 as the cutting-jet 28 moves along the cutting path P. As the cutting-jet 28 passes over the compartment 56b, the cutting-jet 28 agitates the waste-fluid 12 to suspend a significant portion of the abrasive particles 14 within the compartment 56b without additional mechanical agitation. The compartment 56b allows the cutting-jet 28 to adequately suspend the abrasive particles 14 in the waste-fluid 12 without additional mechanical agitation because the dividers 52 and 54 concentrate the turbulence generated by the cutting-jet 28 and contain the abrasive particles 14 within the relatively small volume of compartment 56b. The fluid flow $F_1$ through the first conduit section 60a accordingly draws a portion of the waste-fluid 12 and the suspended abrasive particles 14 through the first conduit section 60a. The first fluid flow $F_1$ exits from the first conduit section 60a, and the second fluid flow $F_2$ in the second conduit section 60a draws the first fluid flow $F_1$ into the second intake opening 68 of the second conduit section 60b. The suspended abrasive particles 14 from compartment 56b are thus transported to the settling container 46 through the first and second conduit sections 60a and 60b. The clarified fluid 16 in the settling container 46 can then be returned to the catch tank 42 to maintain a desired fluid level within the tank 42, or the clarified fluid 16 can be disposed of in an environmentally safe manner.

One aspect of the cutting machine 10 is that it reduces the downtime to remove abrasive particles from the catch tank 42 compared to many conventional removal systems. The abrasive particle removal system 40 continuously removes abrasive particles from the catch tank 42 without using additional mechanical agitators to suspend the abrasive particles 14 in the waste fluid 12. By continuously removing the abrasive particles from the catch tank 42, the cutting machine 10 does not need to be shut down for cleaning the catch tank 42. Thus, compared to conventional removal techniques that shut down the cutting machines to allow the abrasive particles to settle, the abrasive particle removal system 40 reduces the down-time of the cutting machine 10.

Additionally, another aspect of the cutting machine 10 is that it is generally less expensive to manufacture and operate than conventional cutting machines with centrifugal abrasive removal systems. As set forth above, conventional centrifugal abrasive systems use large, expensive pumps to suspend the abrasive particles in large catch tanks. The abrasive particle removal system 40, however, divides the catch tank 42 into a plurality of smaller compartments 56 that control the fluid flow within the catch tank 42 so that the cutting-jet 28 suspends the abrasive particles in an active compartment 56 without additional mechanical agitation. The abrasive particle removal system 40 can accordingly use inexpensive, low volume fluid drive systems instead of the large, expensive pumps. Thus, the abrasive particle removal system 40 is less expensive to manufacture and operate than large capacity centrifugal abrasive removal systems.

Still another aspect of the abrasive particle removal system 40 is that it is reliable and does not require a significant amount of maintenance. The removal system 40 has very few moving components, and none of the moving components directly contact the abrasive particles. In contrast to the removal system 40, the conventional conveyor rake and centrifugal removal systems have several moving parts that directly contact the abrasive particles. As such, the abrasive particles can wear down many important components of conventional removal systems (e.g., conveyor rakes, pumps and centrifugal separators). Thus, because the removal system 40 has very few moving parts, it is a reliable system that does not require a significant amount of downtime for maintenance.

Figure 3:
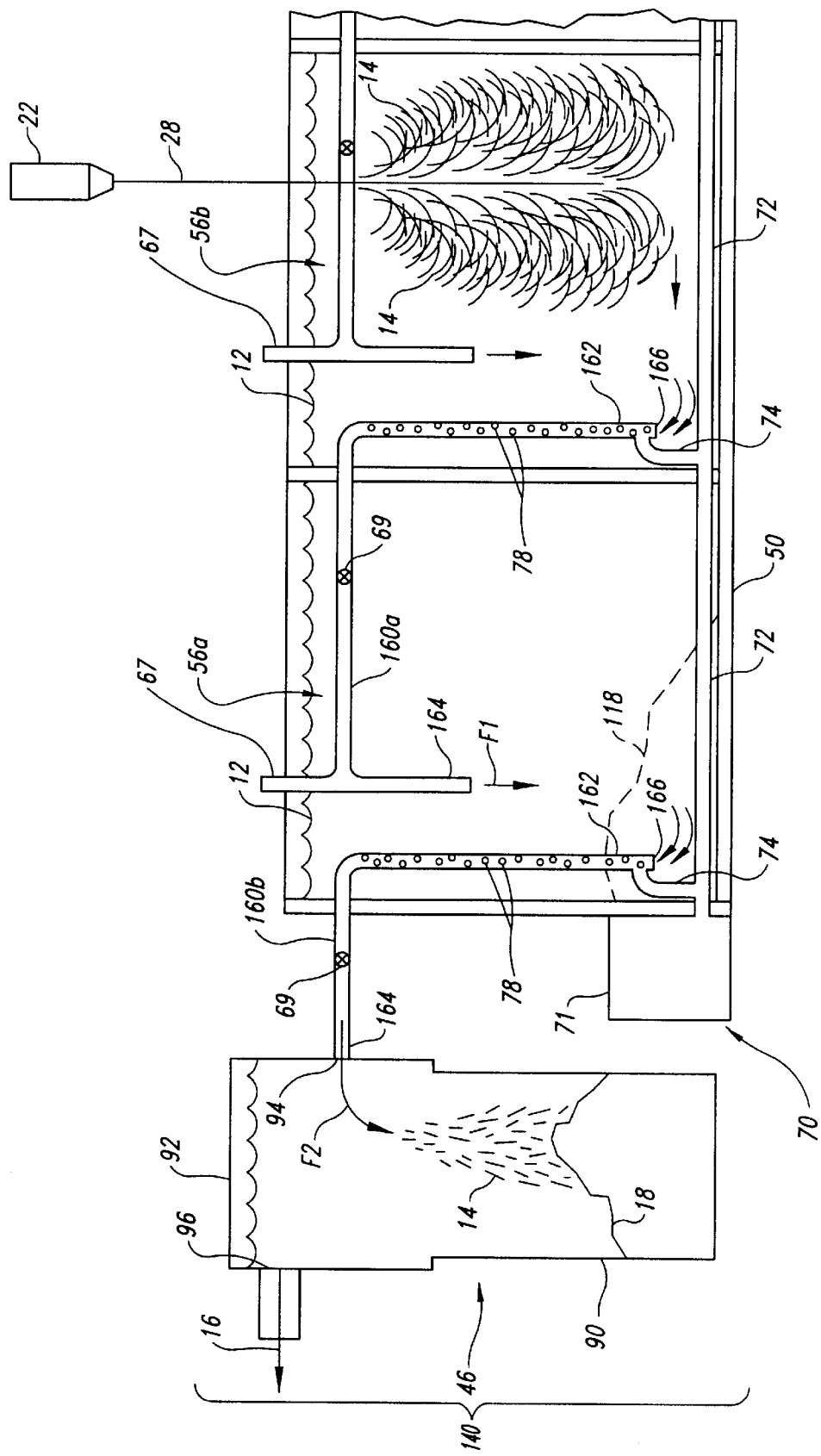
FIG. 3 is a partial cross-sectional view of another embodiment of an abrasive particle removal system for a fluid-jet cutting machine.

FIG. 3 is a partial cross-sectional view of another embodiment of an abrasive particle removal system 140. The abrasive particle removal system 140 illustrated in FIG. 3 is similar to the removal system 40 illustrated in FIG. 2, and thus like reference numbers refer to like components. Referring to FIG. 3, a first conduit section 160a has a first end 162 positioned in a lower portion of compartment 56b and a second end 164 positioned in compartment 56a. Additionally, a second conduit section 160b has a first end 162 positioned in compartment 56a and a second end 164 coupled to the shroud inlet 94. Each conduit section 160a and 160b has a back-flush valve 69 to control the fluid flows through the conduit sections. Unlike the removal system 40 of FIG. 2, the first ends 162 of the conduit sections 160 have a single intake opening 166. In operation, therefore, the gas 78 from the pressurized gas source 71 rises through the conduit sections 160a and 160b to generate the first and second flows $F_1$ and $F_2$.

FIG. 3 also illustrates the operation of the back-flush valves 69 in the conduit sections. For example, the abrasive particles in the first flow $F_1$ may accumulate in an abrasive particle accumulation 118 in compartment 56a at the first end 162 of the second conduit section 160b. The abrasive particle accumulation 118 in compartment 56a may eventually block the intake opening 166 of the second conduit section 160b. To clear the intake opening 166 in compartment 56a, the back-flush valve 69 in the second conduit section 56b is closed. The pressure in the second conduit section 160b upstream from the back-flush valve 69 builds until it blows backward through the intake opening 166. The pressurized gas source 71 accordingly should operate at 70–150 psi to provide sufficient pressure to blow abrasive particle accumulations away from the first end 162 of the second conduit section 160b.

Figure 4:
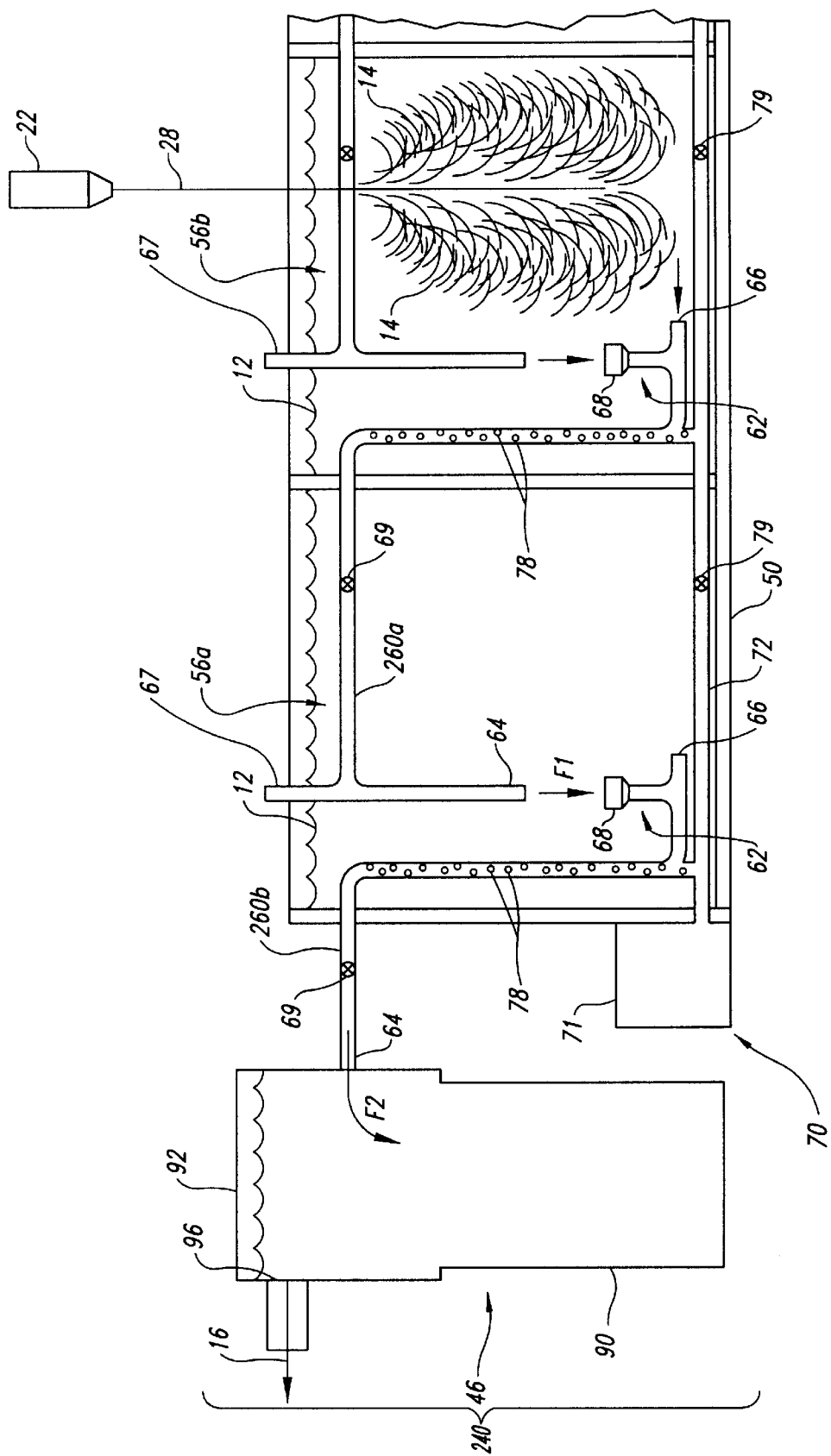
FIG. 4 is a partial cross-sectional view of another embodiment of an abrasive particle removal system for a fluid-jet cutting machine.

FIG. 4 is a partial cross-sectional view of still another embodiment of an abrasive particle removal system. The abrasive particle removal system 240 has conduit sections 260 (identified by reference numbers 260a and 260b) with first ends 62 coupled directly to the primary line 72 of the fluid drive system 70. As such, the gas 78 rises through the vertical portions of the conduit sections 260 to draw the fluid through the first and second intake openings 66 and 68. Additionally, a second back-flush valve 79 may be positioned in the primary line 72 after the connection of each conduit section 260. To clear a first conduit section 260a, for example, the back-flush valve 69 in the first conduit section 260a and the back-flush valve 79 in compartment 56b are closed to allow pressure to build within the first conduit section 260a.

Figure 5:
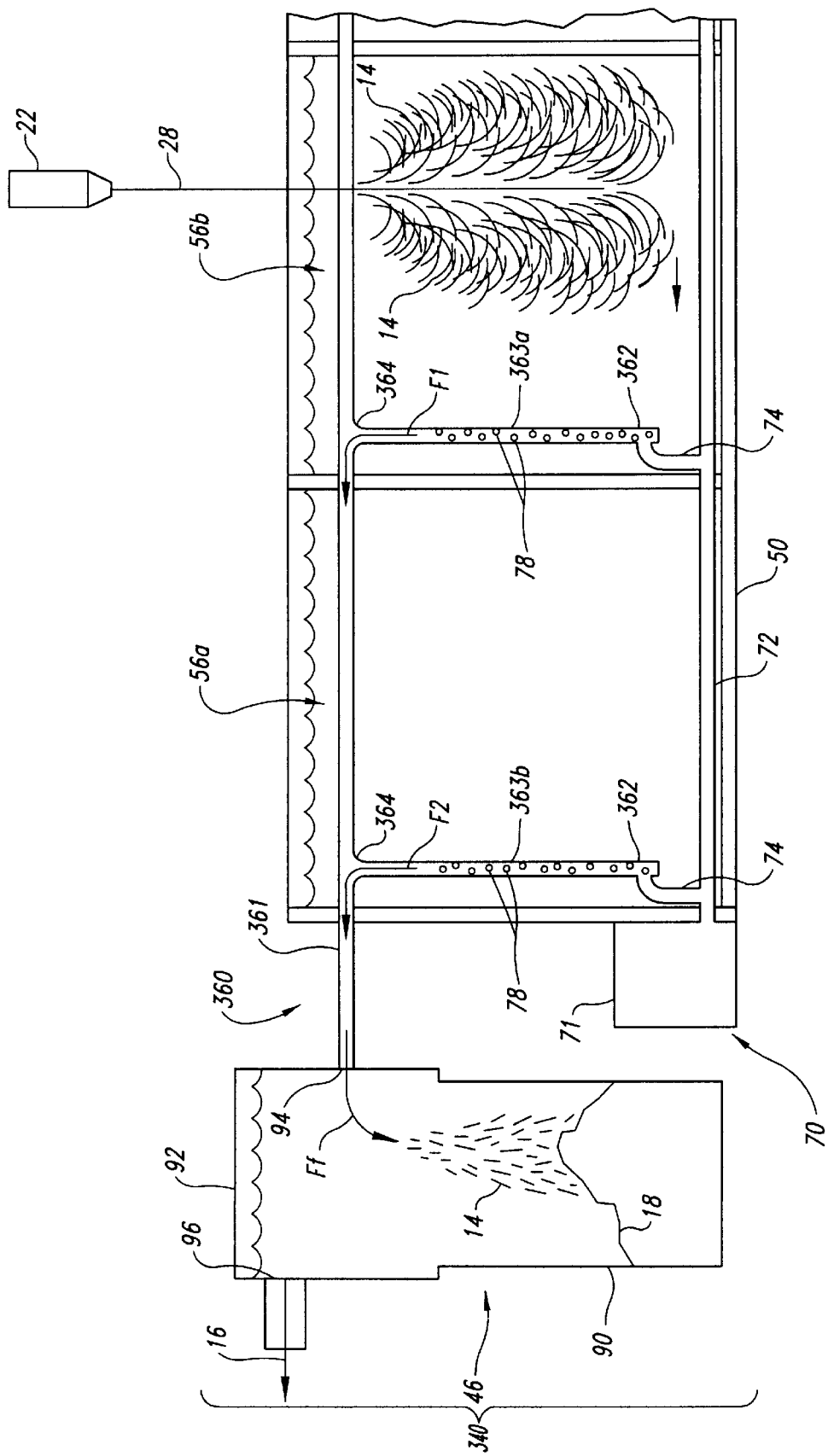
FIG. 5 is a partial cross-sectional view of another embodiment of an abrasive particle removal system for a fluid-jet cutting machine.

FIG. 5 is a partial cross-sectional view illustrating another abrasive removal system 340 having a conduit 360 with a main conduit section 361 and a plurality of compartment conduit sections 363 (indicated by reference numbers 363a and 363b). For example, a first conduit section 363a has a first end 362 in the lower portion of compartment 56b and a second end 364 attached to the main conduit section 361. Similarly, a second conduit section 363b has a first end 362 in the lower portion of compartment 56a and a second end 364 coupled to the main conduit section 361. In operation, therefore, the fluid drive system 70 draws fluid through the compartment conduit sections 363 and into the main conduit section 361 such that a final fluid flow $F_f$ flows through the shroud inlet 94.

Figure 6:
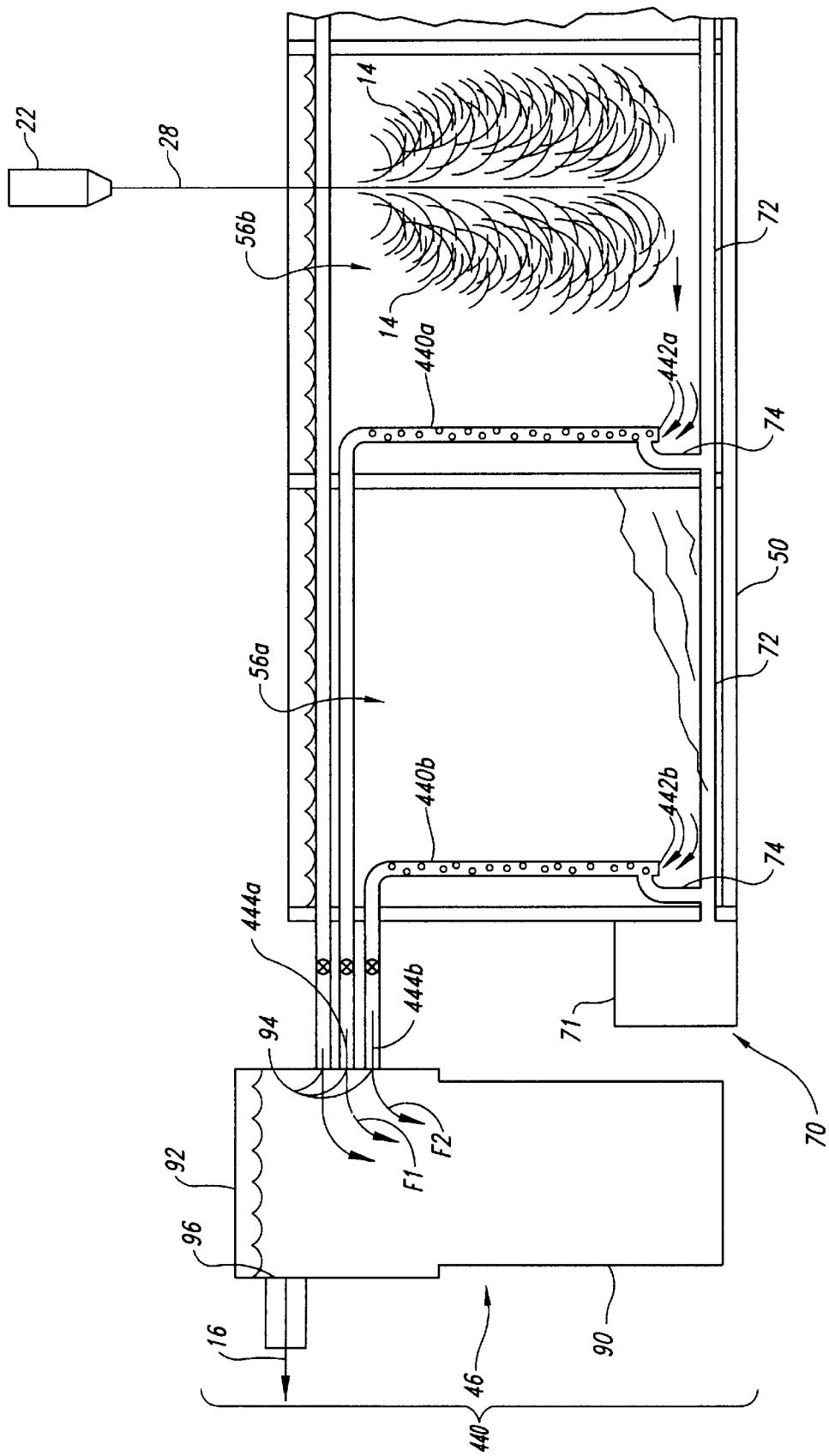
FIG. 6 is a partial cross-sectional view of another embodiment of an abrasive particle removal system for a fluid-jet cutting machine.

FIG. 6 is a partial cross-sectional view illustrating still another abrasive removal system 440 in which the conduit sections 440 (identified by reference numbers 440a and 440b) operate in parallel to individually deliver separate fluid flows $F_1$ and $F_2$ into the settling container 46. In this embodiment, a first fluid section 440a has a first end 442a positioned in a lower portion of compartment 56b and a second end 444a coupled to the shroud inlet 94. A second conduit section 440b has a first end 442b positioned in compartment 56a and a second end 444b also coupled to the shroud inlet 94. Thus, in this embodiment, a number of parallel fluid flows are delivered to the settling container 46.

Figure 7:
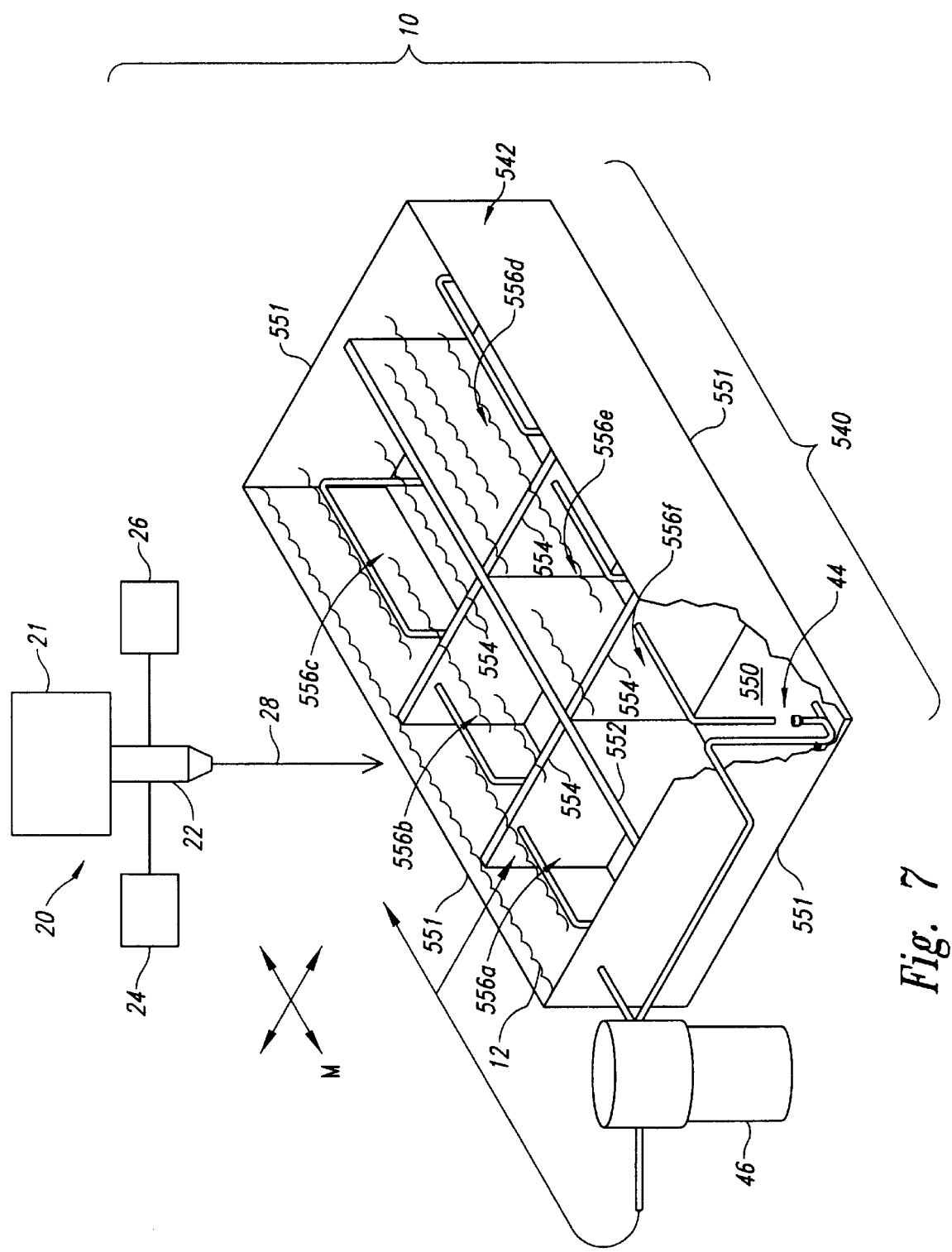
FIG. 7 is a schematic isometric view of another fluid-jet cutting machine with a cut-away view of another embodiment of an abrasive particle removal system.

FIG. 7 is a schematic isometric view of another abrasive particle removal system 540 for use with the cutting machine 10. The removal system 540 has a catch tank 542 with a longitudinal divider 552 extending longitudinally along the tank 542 and a number of crossing dividers 554 extending transverse to the longitudinal divider 552. The sidewalls 551 project upward from a bottom panel 550 to an elevation above the top edges of the dividers 552 and 554 such that the level of the waste-fluid 12 can be above the top edges of the dividers. The dividers 552 and 554 may thus be baffles that define a plurality of compartments 556 (identified individually by reference numbers 556a–556f) that restrict the fluid flow from one compartment to another, but still allow the fluid to flow over the baffles.

From the foregoing it will be appreciated that, although specific embodiments of the invention have been described herein for purposes of illustration, various modifications may be made without deviating from the spirit and scope of the invention. For example, the fluid driver 71 of the fluid drive system 70 can be a pump or an impeller instead of a pressurized gas source to drive a fluid through the primary line 72 and feed lines 74. Additionally, the removal systems could also be used to remove other solids from a catch tank generated by abrasive or non-abrasive cleaning and/or cutting operations. Such additional applications may be separating paint chips, dirt and other solids from a catch tank in ship cleaning, building cleaning and many other cleaning applications. Accordingly, the invention is not limited except as by the appended claims.

What is claimed is:

1. An abrasive particle removal device for use with a fluid-jet cutting machine having a nozzle, a high-pressure fluid source and an abrasive particle source coupled to the nozzle to generate a fluid-jet having a fluid and a plurality of abrasive particles, and a carrier assembly attached to the nozzle to move the nozzle along a cutting path, the particle removal device comprising:

a tank including at least one compartment configured to receive the fluid and the abrasive particles of the fluid-jet along at least a portion of the cutting path and further configured to control fluid flow out of the one compartment, the controlled fluid flow of the one compartment and the fluid-jet concentrating turbulence generated by the fluid jet in the one compartment to maintain at least a substantial portion of the abrasive particles in suspension in the fluid in the one compartment without additional agitation;

a fluid transport mechanism including a conduit, the conduit having a first end in fluid communication with the one compartment and a second end outside of the one compartment with the first end of the conduit positioned in a lower portion of the one compartment;

a settling container separate from the one compartment, the second end of the conduit being in fluid communication with the settling container, a portion of the fluid with suspended abrasive particles in the one compartment being transported through the conduit from the one compartment into the settling container, and the abrasive particles from the transported portion of fluid settling to a lower portion of the settling container while a clarified fluid is removed from the settling container through an outlet of the settling container; and a fluid drive system comprising a pressurized gas source attached to the conduit at a location below a fluid level in the one compartment, a gas from the pressurized gas source being injected into the conduit and the gas rising through at least a portion of the conduit, the rising gas drawing fluid and abrasive particles suspended in the fluid through the conduit from the one compartment to the settling container.

2. The removal device of claim 1 wherein the fluid drive system further comprises a back-flush valve in the conduit between the second end and the location of attachment of the pressurized gas source, the back-flush valve being positionable in an open position to allow fluid to flow through the conduit and a closed position to allow pressure to build in the conduit for clearing a blockage of abrasive particles from the first end of the conduit.

3. An abrasive particle removal device for use with a fluid-jet cutting machine having a nozzle, a high-pressure fluid source and an abrasive particle source coupled to the nozzle to generate a fluid-jet having a fluid and a plurality of abrasive particles, and a carrier assembly attached to the nozzle to move the nozzle along a cutting path, the particle removal device comprising:

a tank including at least one compartment configured to receive the fluid and the abrasive particles of the fluid-jet along at least a portion of the cutting path and further configured to control fluid flow out of the one compartment, the controlled fluid flow of the one compartment and the fluid-jet concentrating turbulence generated by the fluid jet in the one compartment to maintain at least a substantial portion of the abrasive particles in suspension in the fluid in the one compartment without additional agitation;

a fluid transport mechanism including a conduit, the conduit having a first end in fluid communication with the one compartment and a second end outside of the one compartment with the first end of the conduit positioned in a lower portion of the one compartment;

a settling container separate from the one compartment, the second end of the conduit being in fluid communication with the settling container, a portion of the fluid with suspended abrasive particles in the one compartment being transported through the conduit from the one compartment into the settling container, and the abrasive particles from the transported portion of fluid settling to a lower portion of the settling container while a clarified fluid is removed from the settling container through an outlet of the settling container; and a fluid drive system comprising a pump attached to the conduit at the discharge end of the pump so that no fluid from the one compartment is in direct contact with the suction end of the pump, the pump driving fluid through the conduit from the one compartment to the settling container.

4. The removal system of claim 3 wherein the pump comprises a diaphragm pump.

5. An abrasive particle removal device for use with a fluid-jet cutting machine having a nozzle, a high-pressure fluid source and an abrasive particle source coupled to the nozzle to generate a fluid-jet having a fluid and a plurality of abrasive particles, and a carrier assembly attached to the nozzle to move the nozzle along a cutting path, the particle removal device comprising:

a tank including at least one compartment configured to receive the fluid and the abrasive particles of the fluid-jet along at least a portion of the cutting path and further configured to control fluid flow out of the one compartment, the controlled fluid flow of the one compartment and the fluid-jet concentrating turbulence generated by the fluid jet in the one compartment to maintain at least a substantial portion of the abrasive particles in suspension in the fluid in the one compartment without additional agitation;

a fluid transport mechanism including a conduit, the conduit having a first end in fluid communication with the one compartment and a second end outside of the one compartment with the first end of the conduit positioned in a lower portion of the one compartment;

a settling container separate from the one compartment, the second end of the conduit being in fluid communication with the settling container, a portion of the fluid with suspended abrasive particles in the one compartment being transported through the conduit from the one compartment into the settling container, and the abrasive particles from the transported portion of fluid settling to a lower portion of the settling container while a clarified fluid is removed from the settling container through an outlet of the settling container; and a fluid drive system comprising a motor with a drive shaft and an impeller attached to the drive shaft, the impeller being positioned with respect to the conduit to drive fluid through the conduit from the one compartment to the settling container.

6. An abrasive particle removal device for use with a fluid-jet cutting machine having a nozzle, a high-pressure fluid source and an abrasive particle source coupled to the nozzle to generate a fluid-jet having a fluid and a plurality of abrasive particles, and a carrier assembly attached to the nozzle to move the nozzle along a cutting path, the particle removal device comprising:

a tank having a bottom panel, a side wall projecting from the bottom panel to define a reservoir, and at least one divider in the reservoir to divide the tank into a plurality of compartments, the compartments being configured such that the cutting path moves with respect to the tank to pass across at least two of the plurality of the compartments, each compartment being configured to receive the fluid and the abrasive particles from the fluid-jet as the fluid-jet passes across each compartment and each compartment further being configured to control fluid flow to an adjacent compartment, such that while the fluid-jet passes across one of the compartments, the controlled fluid flow of the one of the compartments and the fluid-jet concentrate turbulence generated by the fluid-jet in the one compartment to maintain at least a substantial portion of the abrasive particles in suspension in the fluid in the one of the compartments without additional agitation;

a fluid transport mechanism including a conduit, the conduit having a first end in fluid communication with at least one of the compartments and a second end outside of the compartment;

a settling container separate from at least one of the compartments, the second end of the conduit being in fluid communication with the settling container, a portion of the fluid with suspended abrasive particles in the compartment being transported through the conduit from the compartment into the settling container, and the abrasive particles from the transported portion of fluid settling to a lower portion of the settling container while a clarified fluid is removed from the settling container through an outlet of the settling container.

7. The removal device of claim 6 wherein the tank comprises:

a bottom panel, a first side-wall projecting from one side of the bottom panel, a second side-wall projecting from another side of the bottom panel and juxtaposed to the first side-wall, a first end-wall projecting from one end of the bottom panel, and a second end-wall projecting from another end of the bottom panel and juxtaposed to the first end-wall, the first and second end-walls being attached to the first and second side-walls; and at least one divider extending across the tank between one of side-walls or the end-walls to divide the tank into at least two compartments.

8. The removal device of claim 6 wherein:

the tank comprises at least a first compartment and at least a second compartment;

the conduit comprises a first conduit section extending from the first compartment directly to the settling container and a second conduit section extending from the second compartment directly to the settling container, the first conduit section having a first end positioned in a lower portion of the first compartment and a second end open to the settling container, the second conduit section having a first end positioned in a lower portion of the second compartment and a second end open to the settling container; and the fluid transport system further comprises a fluid drive system coupled to the first and second conduit sections, the fluid drive system driving a first fluid flow through the first conduit section from the first compartment to the settling container, and the fluid drive system driving a second fluid flow through the second conduit section from the second compartment to the settling container.

9. The removal device of claim 6 wherein:

the tank comprises at least a first compartment and a second compartment;

the conduit comprises at least a first conduit section and a second conduit section, the first conduit section having a first end positioned in a lower portion of the first compartment and a second end positioned in the second compartment, the second conduit section having a first end positioned in a lower portion of the second compartment and located to receive a first fluid flow from the first conduit section, and the second conduit section further including a second end open to the settling container; and the fluid transport system further comprises a fluid drive system coupled to the first and second conduit sections, the fluid drive system driving the first fluid flow through the first conduit section from the first compartment to the second compartment, and the fluid drive system driving a second fluid flow through the second conduit section from the second compartment to the settling container.

10. The removal device of claim 6 wherein the first end of the conduit is positioned at a lower portion of the at least one compartment and the second end of the conduit is positioned below the first end and in the settling container, the fluid and the abrasive particles suspended in the fluid flowing through the conduit from the compartment to the settling container under the influence of gravity.

11. The removal device of claim 6 wherein the fluid transport mechanism further comprises a fluid drive system coupled to the conduit, the fluid drive system driving fluid and abrasive particles suspended in the fluid through the conduit to the settling container.

12. The removal device of claim 6 wherein:

the tank comprises at least a first compartment and a second compartment;

the conduit comprises a main selection, a first conduit section coupled to the main section, and a second conduit section also coupled to the main section, the first conduit section having a first end positioned in a lower portion of the first compartment and a second end attached to the main section, the second conduit section having a first end positioned in a lower portion of the second compartment and a second end attached to the main section, and the main section having a discharge end open to the settling container; and the fluid transport system further comprises a fluid drive system coupled to at least one of the first, the second and the main conduit sections, the fluid drive system driving a first fluid flow through the first conduit section from the first compartment to the main section, and the fluid drive system driving a second fluid flow through the second conduit section from the second compartment to the main section, the first and second fluid flows passing through the discharge end of the main section to the settling container.

13. The removal device of claim 7 wherein the divider comprises a baffle around which a restricted fluid flow may pass from a first compartment to an adjacent second compartment.

14. The removal device of claim 9 wherein the fluid drive system comprises:

a pressurized gas source; and a gas line coupled to the gas source, the gas line having a first segment attached to the first conduit section a location below a fluid level in the first compartment, and the gas line having a second segment attached to the second conduit section at a location below a fluid level of the second compartment, a gas from the pressurized gas source being injected into the first and second conduit sections and the gas rising through the conduit sections to draw the first and second fluid flows through the first and second conduit sections, respectively.

15. The removal device of claim 14 wherein the fluid drive system further comprises:

a first back-flush valve in the first conduit section between the second end of the first conduit section and the location of attachment of the first gas line, the first back-flush valve being positionable in an open position to allow the first fluid flow through the first conduit section and a closed position to allow pressure to build in the first conduit section for clearing a blockage of abrasive particles from the first end of the first conduit section; and a second back-flush valve in the second conduit section between the second end of the second conduit section and the location of attachment of the second gas line, the second back-flush valve being positionable in an open position to allow the second fluid flow through the second conduit section and a closed position to allow pressure to build in the second conduit section for clearing a blockage of abrasive particles from the first end of the second conduit section.

16. An abrasive particle removal device for use with a fluid-jet cutting machine having a nozzle, a high-pressure fluid source and an abrasive particle source coupled to the nozzle to generate a fluid-jet having a fluid and a plurality of abrasive particles, and a carrier assembly attached to the nozzle to move the nozzle along a cutting path, the particle removal device comprising:

a tank including at least one compartment configured to receive the fluid and the abrasive particles of the fluid-jet along at least a portion of the cutting path and further configured to control fluid flow out of the one compartment, the controlled fluid flow of the one compartment and the fluid-jet concentrating turbulence generated by the fluid jet in the one compartment to maintain at least a substantial portion of the abrasive particles in suspension in the fluid in the one compartment without additional agitation;

a fluid transport mechanism including a conduit, the conduit having a first end in fluid communication with the one compartment and a second end outside of the one compartment;

a settling container including a drum having a rim defining an opening of the drum and a detachable shroud attached to the drum, with the second end of the conduit being attached to the shroud such that a portion of the fluid with the suspended abrasive particles in the one compartment may be transported through the conduit from the one compartment into the drum to be deposited into the drum, and with the outlet of the settling container being positioned in the shroud, wherein the abrasive particles accumulate in the drum, and when the drum is full, the shroud is removed from the drum to be placed on another empty drum.

17. An abrasive particle removal device for use with a fluid-jet cutting machine having a nozzle, a high-pressure fluid source and an abrasive particle source coupled to the nozzle to generate a fluid-jet having a fluid and a plurality of abrasive particles, and a carrier assembly attached to the nozzle to move the nozzle along a cutting path, the particle removal device comprising:

a tank including a plurality of compartments, the cutting path crossing at least two of the plurality of the compartments, each compartment being configured to receive the fluid and the abrasive particles from the fluid-jet as the fluid-jet passes across each compartment and to control fluid flow to an adjacent compartment, and, while the fluid-jet passes across one of the compartments, the controlled fluid flow of the one of the compartments and the fluid-jet maintaining at least a substantial portion of the abrasive particles in suspension in the fluid in the one of the compartments without additional mechanical agitation; and a conduit including at least a first conduit section and a second conduit section, the first conduit section having a first end positioned in a lower portion of the first compartment and a second end positioned in the second compartment, the second conduit section having a first end positioned in a lower portion of the second compartment and located to receive a first fluid flow from the first conduit section, and the second conduit section further including a second end open to a settling container, the settling container being separate from the compartments, and capable of receiving a portion of the fluid with suspended abrasive particles from at least one of the compartments, the settling container being configured to allow the abrasive particles from a transported portion of fluid to settle to a lower portion of the settling container while a clarified fluid is removed from the settling container through an outlet of the settling container; and a fluid drive system comprising a pressurized gas source; and a gas line coupled to the gas source, the gas line having a first segment attached to the first conduit section at a location below a fluid level in the first compartment, and the gas line having a second segment attached to the second conduit section at a location below a fluid level of the second compartment, a gas from the pressurized gas source being injected into the first and second conduit sections and the gas rising through the conduit sections to draw the first and second fluid flows through the first and second conduit sections, respectively.

18. The removal device of claim 17 wherein the fluid drive system further comprises:

a first back-flush valve in the first conduit section between the second end of the first conduit section and the location of attachment of the first gas line, the first back-flush valve being positionable in an open position to allow the first fluid flow through the first conduit section and a closed position to allow pressure to build in the first conduit section for clearing a blockage of abrasive particles from the first end of the first conduit section; and a second back-flush valve in the second conduit section between the second end of the second conduit section and the location of attachment of the second gas line, the second back-flush valve being positionable in an open position to allow the second fluid flow through the second conduit section and a closed position to allow pressure to build in the second conduit section for clearing a blockage of abrasive particles from the first end of the second conduit section.

* * * * *